(12) United States Patent
Oshima

(10) Patent No.: US 10,297,051 B2
(45) Date of Patent: May 21, 2019

(54) INFORMATION PROCESSING DEVICE, DISPLAY METHOD, AND PROGRAM STORAGE MEDIUM FOR MONITORING OBJECT MOVEMENT

(71) Applicant: NEC Corporation, Minato-ku, Tokyo (JP)

(72) Inventor: Akiko Oshima, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/508,573

(22) PCT Filed: Sep. 7, 2015

(86) PCT No.: PCT/JP2015/004526
§ 371 (c)(1),
(2) Date: Mar. 3, 2017

(87) PCT Pub. No.: WO2016/038872
PCT Pub. Date: Mar. 17, 2016

(65) Prior Publication Data
US 2017/0263024 A1    Sep. 14, 2017

(30) Foreign Application Priority Data
Sep. 11, 2014    (JP) .................................. 2014-184741

(51) Int. Cl.
*G06T 11/20*    (2006.01)
*G06Q 30/02*    (2012.01)
(Continued)

(52) U.S. Cl.
CPC ........ *G06T 11/203* (2013.01); *G06K 9/00342* (2013.01); *G06K 9/00536* (2013.01);
(Continued)

(58) Field of Classification Search
CPC ..... G06T 11/203; G06T 7/20; G06K 9/00342; G06K 9/00536
See application file for complete search history.

(56) References Cited

U.S. PATENT DOCUMENTS

| | | | | |
|---|---|---|---|---|
| 5,969,755 A | * | 10/1999 | Courtney | ............ G06F 17/3079 |
| | | | | 348/135 |
| 2010/0013931 A1 | * | 1/2010 | Golan | ................ G06K 9/00771 |
| | | | | 348/150 |

(Continued)

FOREIGN PATENT DOCUMENTS

| JP | H06-176004 A | 6/1994 |
|---|---|---|
| JP | H11-288213 A | 10/1999 |

(Continued)

OTHER PUBLICATIONS

Machine Translation to English of JP 2012-246115.*
(Continued)

*Primary Examiner* — Barry Drennan
*Assistant Examiner* — Terrell M Robinson

(57) ABSTRACT

To display with a display mode with which an analyst may easily ascertain actions (movements) of objects being monitored, provided is an information processing device, including a sensing and a display control unit. The sensing unit classifies, based on information relating to movements of objects being monitored, a plurality of objects into set movement paths. The display control unit controls a display such that the movements of the objects are displayed in a display screen of the display with an arrow in each set movement path. The axis of the arrow which is displayed in the display has a thickness according to the number of objects which are classified in the corresponding movement path, has a shape according to the trace of the objects which are classified in the corresponding movement path, and (Continued)

furthermore, the direction indicated by the arrow represents the direction of progress of the objects.

7 Claims, 11 Drawing Sheets

(51) Int. Cl.
    *G06K 9/00*     (2006.01)
    *G06T 7/20*     (2017.01)

(52) U.S. Cl.
    CPC ......... *G06Q 30/02* (2013.01); *G06Q 30/0201* (2013.01); *G06T 7/20* (2013.01); *G06T 2207/10016* (2013.01); *G06T 2207/20076* (2013.01); *G06T 2207/30196* (2013.01); *G06T 2207/30241* (2013.01); *G06T 2207/30242* (2013.01)

(56) References Cited

U.S. PATENT DOCUMENTS

| | | | |
|---|---|---|---|
| 2011/0200226 A1 | 8/2011 | Takahata et al. | |
| 2011/0304497 A1* | 12/2011 | Molyneux | A43B 1/0054 342/42 |
| 2012/0059581 A1 | 3/2012 | Sambongi | |
| 2013/0002854 A1* | 1/2013 | Nielsen | H04N 7/183 348/94 |
| 2013/0271602 A1* | 10/2013 | Bentley | H04N 7/18 348/143 |
| 2014/0222501 A1 | 8/2014 | Hirakawa et al. | |
| 2015/0104149 A1* | 4/2015 | Sim | G11B 27/031 386/241 |

FOREIGN PATENT DOCUMENTS

| | | |
|---|---|---|
| JP | 2001-124577 A | 5/2001 |
| JP | 2010-123069 A | 6/2010 |
| JP | 2011-170565 A | 9/2011 |
| JP | 2012-052937 A | 3/2012 |
| JP | 2012-246115 A | 12/2012 |
| JP | 2013-122652 A | 6/2013 |
| JP | 5356615 B1 | 12/2013 |
| JP | 2015-069639 A | 4/2015 |

OTHER PUBLICATIONS

Machine Translation to English of JP 2012-052937.*
Machine Translation to English of JPH 11-288213.*
International Search Report for PCT Application No. PCT/JP2015/004526, dated Oct. 6, 2015.
English translation of Written opinion for PCT Application No. PCT/JP2015/004526.
Kyoichiro Katabira, "Main stream detection in complex flocks by using laser range scanners and the application for advanced air conditioning control", Sep. 29, 2006, total 73 pages.
Communication dated Mar. 6, 2018, from Japanese Patent Office in counterpart application No. 2016-547695.
Japanese Office Action for JP Application No. 2016-547695 dated Aug. 7, 2018 with English Translation.

* cited by examiner

INFORMATION PROCESSING DEVICE, DISPLAY METHOD, AND PROGRAM STORAGE MEDIUM FOR MONITORING OBJECT MOVEMENT

This application is a National Stage Entry of PCT/JP2015/004526 filed on Sep. 7, 2015, which claims priority from Japanese Patent Application 2014-184741 filed on Sep. 11, 2014, the contents of all of which are incorporated herein by reference, in their entirety.

TECHNICAL FIELD

The present invention relates to a technique to display a movement path of an object.

BACKGROUND ART

Research may be performed as to how persons behave within a shop, a warehouse or the like for a purpose of grasping purchasing trends of customers or improving business efficiency of workers. For research of behaviors of persons, information to be obtained from an RFID (Radio-frequency identification) tag carried by a person, an SIM (Subscriber Identity Module) card number of a mobile phone or the like; or a camera image to be captured by a monitor camera or the like is used.

When behaviors of persons are researched, for instance, trace information representing a trace of a behavior of each person is acquired. By analyzing the trace information, information representing purchasing behaviors of customers, or information effective in improving business efficiency of workers is obtained. There is predicted an increase in demand for a technique which allows for an analyst to easily analyze trace information in a short time for obtaining the aforementioned information.

PTL1 describes a customer trend collecting method, in which flow line data of a customer recognized by a flow line recognition system configured in a specific area (a monitoring area) of a shop, and transaction data of the customer processed by a payment device are associated with each other.

PTL 2 describes a customer behavior analysis device having a configuration for collecting conditions in which persons who abandon their self-service actions of choosing commodities from a self-service area in midstream appear.

PTL 3 describes a flow line simulation device of visitors, in which movements of visitors and conditions of staying are predicted. The flow line simulation device displays a probability at which visitors choose a shortest path or a main street by the thickness of an arrow.

CITATION LIST

Patent Literature

[PTL 1] Japanese Laid-open Patent Publication No. 2011-170565
[PTL 2] Japanese Patent Publication No. 5,356,615
[PTL 3] Japanese Laid-open Patent Publication No. H06 (1994)-176004

SUMMARY OF INVENTION

Technical Problem

In the configuration described in PTL 1, a flow line of a person based on flow line data is displayed on a monitoring area (a flow line area) displayed on a display screen. However, in the configuration of PTL 1, it is not supposed that a flow line relating to a plurality of persons is displayed on a monitoring area.

In other words, in the configuration of PTL 1, when a result of analysis of behaviors of persons or a trend is displayed on a display screen, flow line data of persons as an analysis result is displayed individually for each person. When the flow line data is individually displayed for each person as described above, there is an inconvenience that it may be difficult to grasp a behavior analysis result of a plurality of persons within an area to be monitored. Further, in the technique described in PTL 2, a result of analysis of conditions in which a person (a target person) who abandons his/her self-service action in midstream appears is displayed. However, the movement path of the target person is not displayed. Further, in the technique described in PTL 3, displaying a flow line representing how visitors actually behave is not supposed.

A main subject of the present invention is to provide a technique to display a state in which an object to be monitored behaves (moves) in a display manner easily recognizable by, for instance, an analyst.

Solution to Problem

To achieve the main subject, an information processing device of the present invention includes:
a detection unit that classifies a plurality of objects to be monitored into a plurality of movement paths predetermined based on information on movement of each of the objects; and
a display control unit that controls a display device equipped with a display screen to display movement of the object on the display screen using an arrow for each movement path, wherein
an axis of the arrow displayed by the display control unit has thickness depending on a number of the object in the movement path associated, and has shape depending on trace of the object in the movement path associated, a direction of the arrow represents a moving direction of the object.

A display method of the present invention includes:
classifying a plurality of objects to be monitored into a plurality of movement paths predetermined based on information on movement of each of the objects; and
controlling a display device equipped with a display screen to display movement of the object on the display screen using an arrow for each movement path such that an axis of the arrow displayed has thickness depending on a number of the object in the movement path associated, and has shape depending on trace of the object in the movement path associated, and a direction of the arrow represents a moving direction of the object.

A program storage medium of the present invention stores a computer program, the computer program causes a computer to execute:
classifying a plurality of objects to be monitored into a plurality of movement paths predetermined based on information on movement of each of the objects; and
controlling a display device equipped with a display screen to display movement of the object on the display screen using an arrow for each movement path such that an axis of the arrow displayed has thickness depending on a number of the object in the movement path associated, and has shape depending on trace of the object in the movement path associated, and a direction of the arrow represents a moving direction of the object.

Note that the main subject of the present invention is also achieved by a display method of the present invention corresponding to the information processing device of the present invention. Further, the main subject of the present invention is also achieved by a computer program corresponding to the information processing device of the present invention and the display method of the present invention, and a program storage medium storing the computer program.

Advantageous Effects of Invention

According to the present invention, it is possible to display a state in which an object to be monitored behaves (moves) in a display manner easily recognizable by, for instance, an analyst.

DESCRIPTION OF EMBODIMENTS

Figure 1:
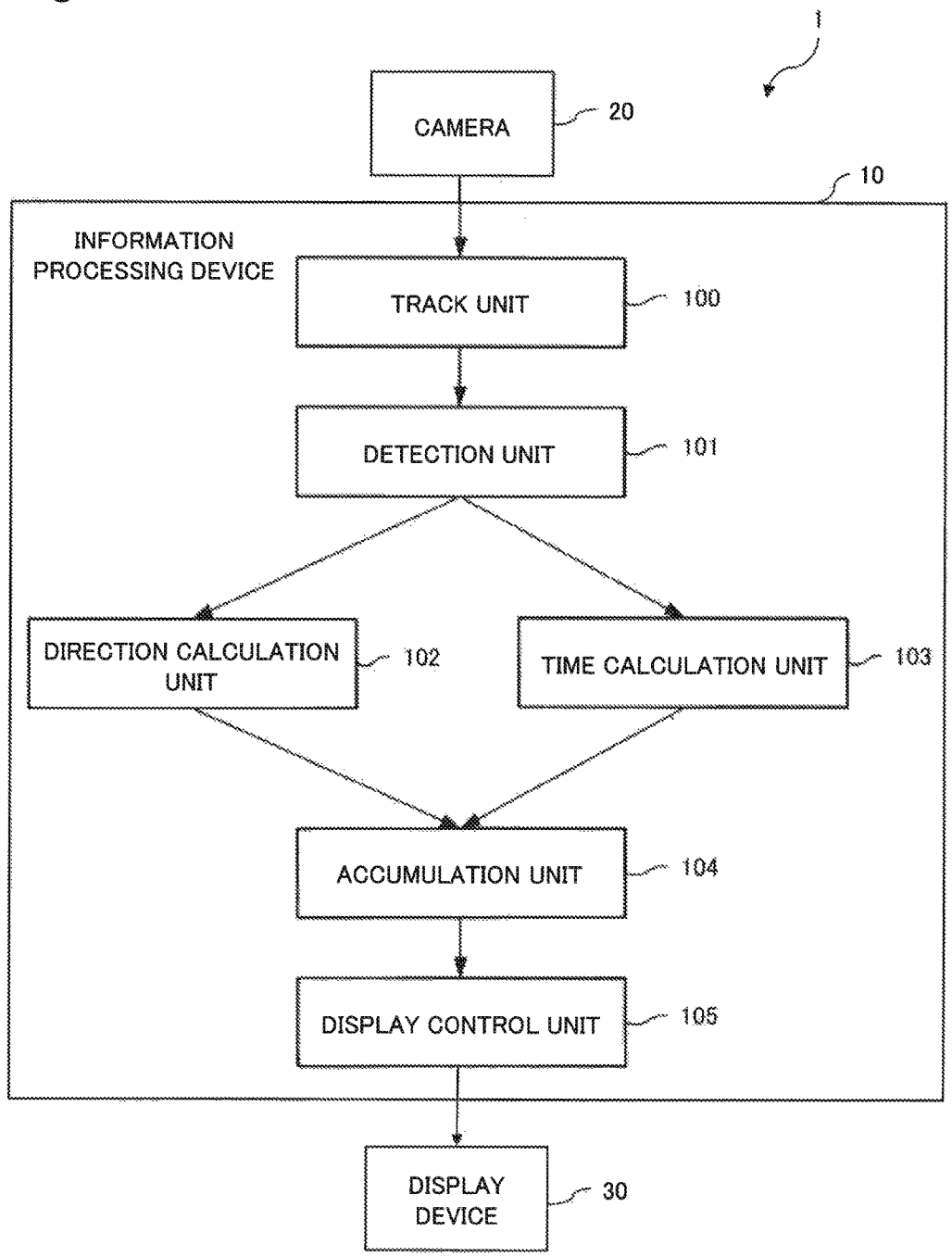
FIG. 1 is block diagram illustrating simply a configuration of an information processing device of a first example embodiment according to the present invention.

In the following, example embodiments according to the present invention are described referring to the drawings.

First Example Embodiment

[Description of Configuration]

FIG. 1 is a block diagram illustrating simply a behavior analysis system provided with an information processing device of the first example embodiment according to the present invention. Note that directions of arrows in the drawing represent an example, and do not limit the directions of signal between blocks.

The behavior analysis system 1 is configured for use in analyzing a behavior of a person on a floor. The behavior analysis system 1 includes an information processing device 10, a camera 20, and a display device 30.

The camera 20 is installed in a state that the camera 20 is capable of capturing a floor to be monitored. The camera 20 has a function of transmitting a captured image to the information processing device 10. The display device 30 equips a display screen (a display), and has a function of displaying information by a control operation of the information processing device 10.

Figure 10:
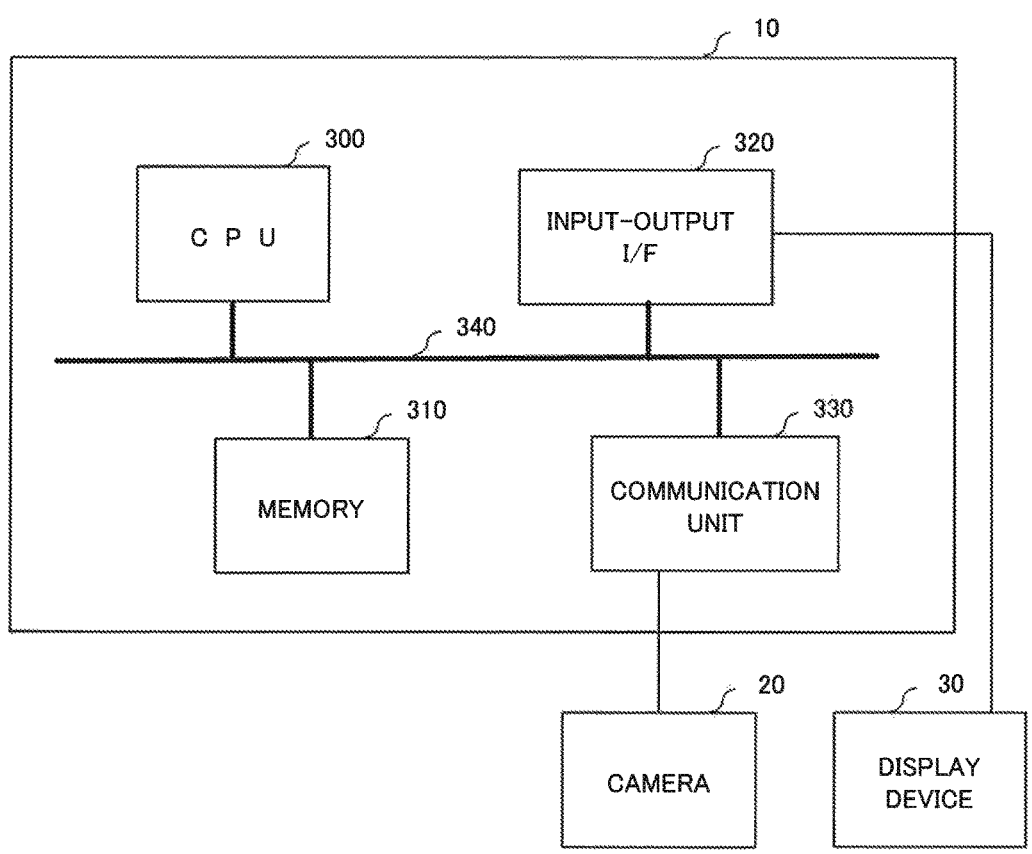
FIG. 10 is a diagram describing an example of a hardware configuration of an information processing device according to the present invention.

The information processing device 10 has a function of analyzing a behavior of a person on a floor with use of an image captured by the camera 20, and causing the display device 30 to display the analysis result. FIG. 10 illustrates an example of a hardware configuration of the information processing device 10 together with the camera 20 and the display device 30. In the example of FIG. 10, the information processing device 10 includes a CPU (Central Processing Unit) 300, a memory 310, an input-output I/F (InterFace) 320, and a communication unit 330. These components are connected to each other by a bus 340.

The input-output I/F 320 has a configuration which enables to communicate information with a peripheral device such as the display device 30. The communication unit 330 has a configuration which enables to communicate with, for instance, the camera 20 using a predetermined communication method (e.g. a wireless LAN (Local Area Network) or an information communication network (e.g. communication via (the Internet)).

The memory 310 is a storage medium (a storage device) which stores data or a computer program (hereinafter, also abbreviated as a program). For instance, the memory 310 stores a program which controls an operation of the information processing device 10. Note that the program is stored in a portable storage medium, for instance. The program may be written in the memory 310 from the portable storage medium. Alternatively, the program may be supplied to the information processing device 10 through an information communication network, and written in the memory 310.

The CPU 300 is able to implement various functions by reading a program stored in the memory 310 and by executing the program. In the first example embodiment, the information processing device 10 implements the following functions by the CPU 300.

Specifically, the information processing device 10 has, as functional units, a track unit 100, a detection unit 101, a direction calculation unit 102, a time calculation unit 103, an accumulation unit 104, and a display control unit 105 as illustrated in FIG. 1.

The track unit 100 has a function of detecting a person as an object to be monitored from a captured image (image including a floor (to be captured (monitored) (hereinafter, also described as a floor image)) using, for instance, image processing. The track unit 100 receives the floor image from the camera 20.

Note that the behavior analysis system 1 described in the first example embodiment may be used as an object movement analysis system which analyzes movement of an object, in place of a behavior of a person. When the behavior analysis system 1 in the first example embodiment is used as an object movement analysis system as described above, the track unit 100 detects an object predetermined as an object to be monitored from the floor image by the camera 20, in place of a person.

Further, the track unit 100 has a function of acquiring position information of a person detected in each frame of the captured image (moving image) by image processing. Further, the track unit 100 has a function of generating tracking information of a person by arranging the position information of the person acquired in a time-series manner. The tracking information is information such that information representing a time (e.g. information for identifying a frame, time information, or information representing the order) is associated with information relating to identification of the person detected, and the position information of the person.

The detection unit 101 has a function of classifying the tracking information generated for each person. Specifically, in response to receiving the tracking information from the track unit 100, the detection unit 101 acquires information relating to identification of the person from the tracking information.

Further, the detection unit 101 classifies the tracking information for each person based on the information acquired. Further, the detection unit 101 outputs the tracking information classified for each person to the direction calculation unit 102 and the time calculation unit 103.

Note that the aforementioned description is made based on the premise that a person moves once on the floor to be monitored (target floor). For instance, when it is known in advance that the number of persons moving on the target floor is one and the person moves two or more times, the detection unit 101 may classify the tracking information for each movement, for instance, movement at a first time and movement at a second time.

The direction calculation unit 102 has a function of generating direction information based on the tracking information. The direction information is information relating to a moving direction of the person detected from the captured image.

Specifically, in response to receiving the tracking information classified for each person, the direction calculation unit 102 correlates the tracking information which is continued timewise and spacewise. Then, the direction calculation unit 102 calculates information relating to movement of the person detected from the captured image (in this example, start point information of movement, and moving direction information of movement on the floor) based on the tracking information correlated. The direction calculation unit 102 outputs the direction information including the calculated information to the accumulation unit 104.

The time calculation unit 103 has a function of generating time information from the tracking information. The time information is time information relating to movement of the person detected from the captured image.

Specifically, in response to receiving the tracking information classified for each person from the detection unit 101, the time calculation unit 103 calculates a move time on the floor to be monitored for each person based on the tracking information. Then, the time calculation unit 103 outputs the time information including the move time calculated to the accumulation unit 104.

The accumulation unit 104 has a function of counting the number of pieces of flow line data as follows. The flow line data is information including the start point information, the moving direction information, and the move time regarding movement of the person detected from the captured image.

Specifically, the accumulation unit 104 receives the direction information from the direction calculation unit 102, and receives the time information from the time calculation unit 103.

The accumulation unit 104 generates the flow line data based on the direction information received and the time information received. Then, the accumulation unit 104 counts the number of pieces of the flow line data including the same moving direction information on the floor to be monitored. Thereafter, the accumulation unit 104 correlates the counted number of pieces of data with the pieces of flow line data counted, and outputs information obtained by correlating the data to the display control unit 105 as an analysis result.

The display control unit 105 has a function of causing the display device 30 to display the analysis result. As described above, the analysis result is information in which the number of pieces of the flow line data including the same moving direction information measured by the accumulation unit 104, and the pieces of the flow line data counted are associated with each other, and represents a movement tendency of persons.

Figure 2:
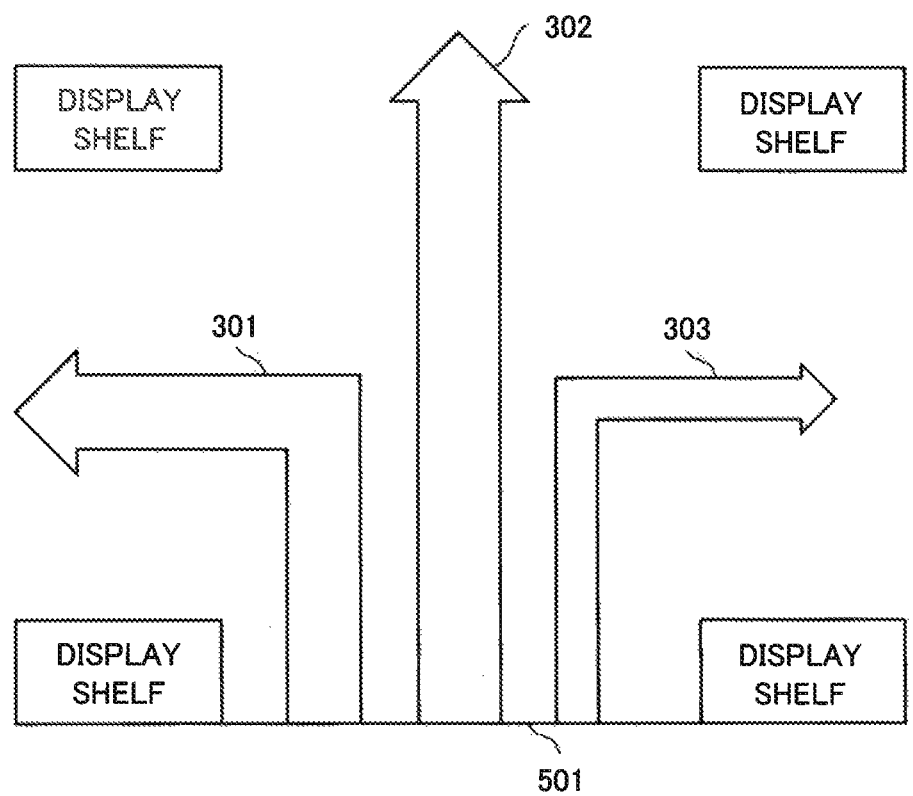
FIG. 2 is a diagram illustrating a display example of an analysis result by the information processing device of the first example embodiment.

FIG. 2 is a diagram illustrating a display example of an analysis result by the display control unit 105.

The analysis results 301 to 303 illustrated in FIG. 2 are information relating to the movement tendency of customers within a shop. The display control unit 105 controls the display device 30 such that the analysis results 301 to 303 are displayed on a plan view of a floor within a shop, as illustrated in FIG. 2.

In this example, the analysis results 301 to 303 are represented by the arrows by the display control unit 105. The directions of the arrows correspond to moving direction information (moving directions of persons) included in the analysis results 301 to 303. The thicknesses of axes of the arrows depending on the numbers of pieces of data (the numbers of persons) included in the analysis results 301 to 303 by the accumulation unit 104. The lengths of axes of the arrows depending on the time information included in the analysis results 301 to 303 (move times of persons (e.g. an average value of move times of a plurality of persons in which the moving directions are the same)). Note that a move time of a person may be displayed by another method.

Further, in the example of FIG. 2, the positions of start points of the arrows representing the analysis results 301 to 303 are aligned at a start point 501. The positions of the start points of the arrows correspond to the positions of start points of movements of persons.

Note that the display example illustrated in FIG. 2 is an example. The analysis results 301 to 303 may be displayed in another display manner, as far as the number of pieces of data by counting of the accumulation unit 104, and pieces of the flow line data associated with the number of pieces of data counted are simultaneously displayed.

Note that in the first example embodiment, there is described an example, in which the aforementioned functions of the information processing device 10 are implemented by the CPU which executes processing according to the program. In place of this, each function of the information processing device 10 may be implemented by a hardware component, or by combination of a hardware component and a software component.

[Description of Operation]

Figure 3:
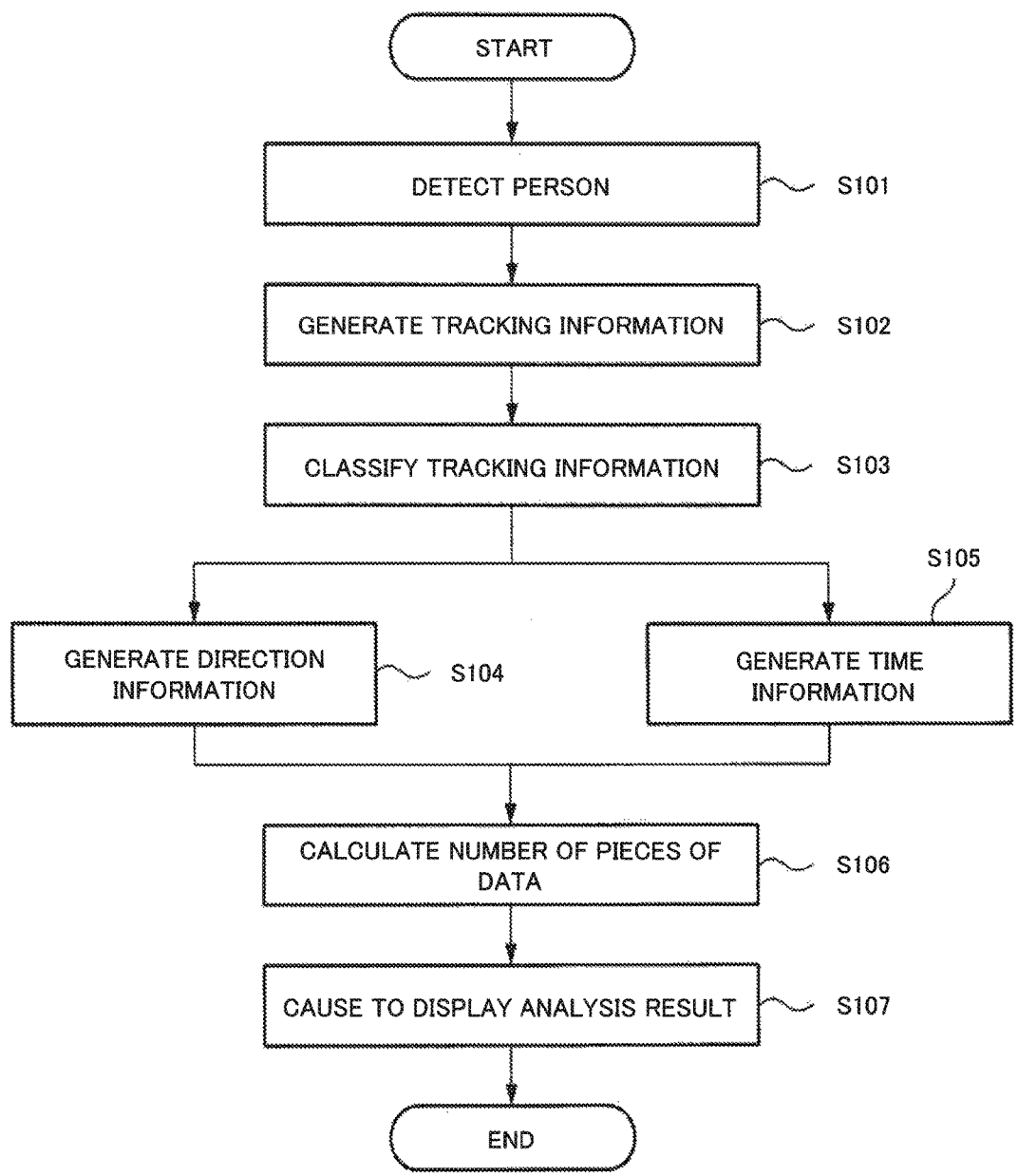
FIG. 3 is a flowchart illustrating an operation example of analysis processing in the information processing device of the first example embodiment.

In the following, an operation example of the information processing device 10 of the first example embodiment is described referring to a flowchart of FIG. 3. FIG. 3 is a flowchart illustrating an operation example of personal behavior analysis processing by the information processing device 10. Note that the flowchart illustrated in FIG. 3 illustrates a processing procedure to be executed by the CPU.

In response to receiving the captured image (the floor image) from the camera 20, the track unit 100 detects the person from the floor image by image processing, for instance (Step S101).

Thereafter, the track unit 100 calculates the position information of the person detected for each frame. Then, the track unit 100 generates the tracking information based on the position information calculated (Step S102). The track unit 100 outputs the tracking information generated to the detection unit 101.

The detection unit 101 classifies the tracking information received for each person (Step S103). Then, the detection unit 101 outputs the tracking information classified for each person to the direction calculation unit 102 and the time calculation unit 103.

The direction calculation unit 102 generates the direction information (information including the start point information of movement and the moving direction information of movement on the floor) based on the tracking information input (Step S104). Thereafter, the direction calculation unit 102 outputs the direction information generated to the accumulation unit 104.

On the other hand, the time calculation unit 103 generates the time information (information including the move time of the person on the floor) based on the tracking information received (Step S105). Then, the time calculation unit 103 outputs the time information generated to the accumulation unit 104.

The accumulation unit 104 generates the flow line data based on the direction information received and time information received. Thereafter, the accumulation unit 104 counts (calculates) the number of pieces of the flow line data including the same moving direction information on the floor to be monitored based on the direction information (Step S106). The accumulation unit 104 correlates the number of pieces of data counted with the pieces of the flow line data counted, and outputs the information to the display control unit 105 as an analysis result.

The display control unit 105 causes the display device 30 to display the analysis result received (Step S107).

The information processing device 10 in the first example embodiment allows for the display control unit 105 to cause the display device 30 to display a plurality of pieces of information included in the analysis result (i.e. the number of pieces of the flow line data including the same moving direction information, and the direction information and the time information included in the pieces of the flow line data). Specifically, the information processing device 10 is able to display the plurality of pieces of information included in the personal behavior analysis result within the area to be monitored such as within a shop or within a warehouse (e.g. attribute information such as the moving direction or the move time of the person, or the number of persons) in a display manner easily recognizable by a user.

Therefore, the user of the information processing device 10 in the first example embodiment can easily check the ratio of the numbers of persons moving in the respective moving directions on the floor to be monitored. Further, the user can easily grasp a customer trend within a shop, or a behavior tendency of work of workers within a warehouse.

Second Example Embodiment

[Description of Configuration]

In the following, the second example embodiment according to the present invention is described referring to the drawings. Note that in the description of the second example embodiment, the same constituent portions as the constituent portions constituting the information processing device and a system provided with the same in the first example embodiment are indicated with the same reference numerals, and repeated description of the common portions is omitted.

In the second example embodiment, as well as the first example embodiment, there is described the information processing device 10 provided in the behavior analysis system 1 which analyzes the behavior of the person on the floor. Note that as described in the description of the first example embodiment, the behavior analysis system 1 in the second example embodiment may be used as the object movement analysis system which analyzes movement of the object, in place of the behavior of the person. In this case, the track unit 100 detects the object predetermined as a target to be monitored from the floor image by the camera 20, in place of a person.

Figure 4:
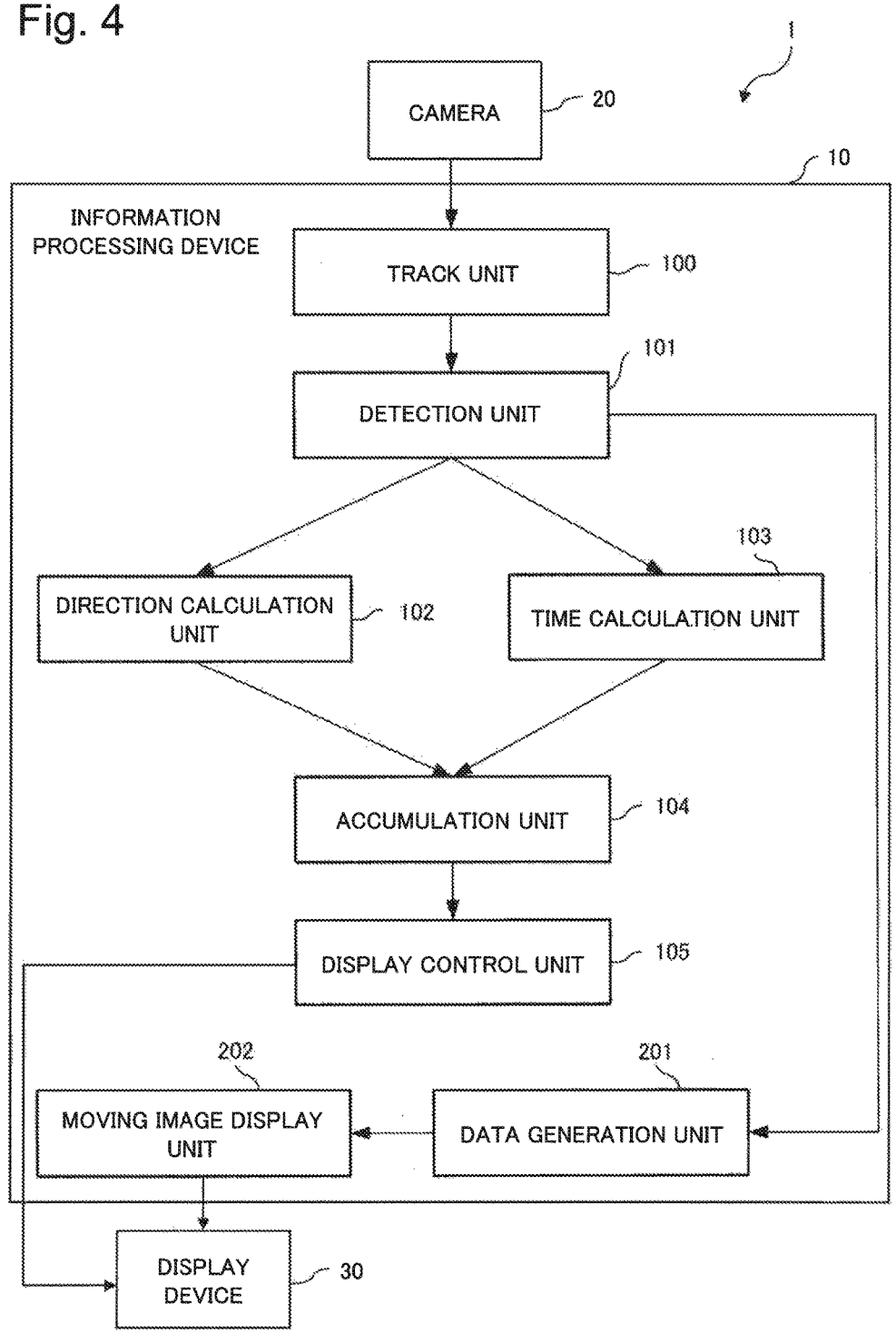
FIG. 4 is a block diagram illustrating simply a configuration of an information processing device of a second example embodiment of the present invention.

FIG. 4 is a block diagram illustrating simply a configuration example of the information processing device of the second example embodiment. Note that directions of arrows in the drawing represent an example, and do not limit the directions of signal between blocks.

As well as the information processing device 10 of the first example embodiment, the information processing device 10 of the second example embodiment is provided with a configuration, in which the personal behavior analysis result is displayed on the display device 30 with use of the direction of the arrow, thickness of the axis, and length of the axis. Further, the information processing device 10 of the second example embodiment is also provided with a configuration, in which movement tendency (movement path) of persons is displayed by the moving image with use of the display device 30. Specifically, in the second example embodiment, the information processing device 10 is provided with the hardware configuration as illustrated in FIG. 10. The information processing device 10 includes, as functional units to be implemented by the CPU, the track unit 100, the detection unit 101, the direction calculation unit 102, the time calculation unit 103, the accumulation unit 104, the display control unit 105, a data generation unit 201, and a moving image display unit 202. In the following, a configuration relating to moving image display is mainly described.

The detection unit 101 outputs the tracking information classified for each person to the direction calculation unit 102, the time calculation unit 103, and the data generation unit 201.

The data generation unit 201 has a function of generating display data based on the tracking information received. Specifically, in response to receiving the tracking information, the data generation unit 201 calculates (detects) information on the start time, the moving direction, and an end time relating to movement of the person based on the tracking information.

Then, the data generation unit 201 generates the display data based on the information calculated. The display data is data relating to the movement of the person, and, for instance, is data in which sets of coordinate points representing positions of the person detected by the detection unit 101, and points of time are arranged in a time-series manner. Thereafter, the data generation unit 201 outputs the display data generated to the moving image display unit 202.

The moving image display unit 202 has a function of causing to display the movement tendency of persons based on the display data received from the data generation unit 201 by the moving image.

Figure 5:
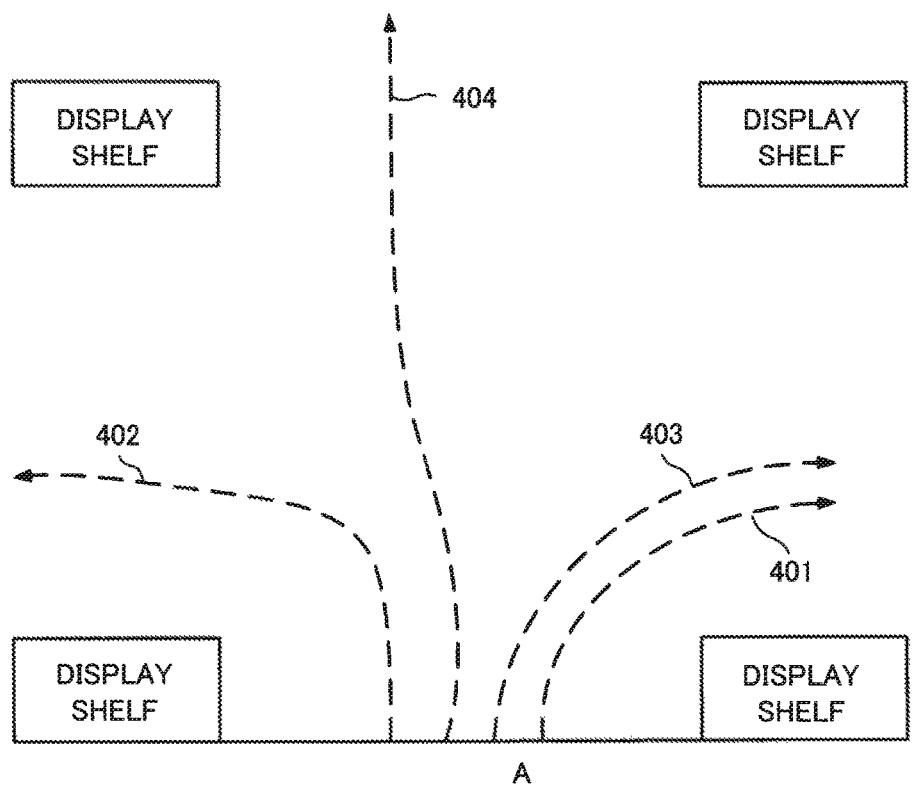
FIG. 5 is a diagram describing a display example of an analysis result by the information processing device of the second example embodiment.

FIG. 5 is a diagram describing a display example of the movement tendency (moving image) of persons based on the display data.

In the example of FIG. 5, the movement tendency of persons based on the display data is illustrated as the flow line information pieces 401 to 404. For instance, the flow line information pieces 401 to 404 in FIG. 5 illustrate the movement tendency of clients on a plan view of the floor to be monitored within a shop.

In the example of FIG. 5, the flow line information pieces 401 to 404 are illustrated by arrows. The shape of the axis of each arrow in the length direction corresponds to the trace of movement of the person. The direction of each arrow corresponds to the moving direction of movement of the person. The length of each arrow depending on the move time of the person. Note that in the example of FIG. 5, the thicknesses of axes of the arrows representing the flow line information pieces 401 to 404 are the same. However, as well as the first example embodiment, the axis of each arrow may be displayed with thickness depending on the number of persons also when the movement tendency of persons is displayed by the moving image.

Figure 6:
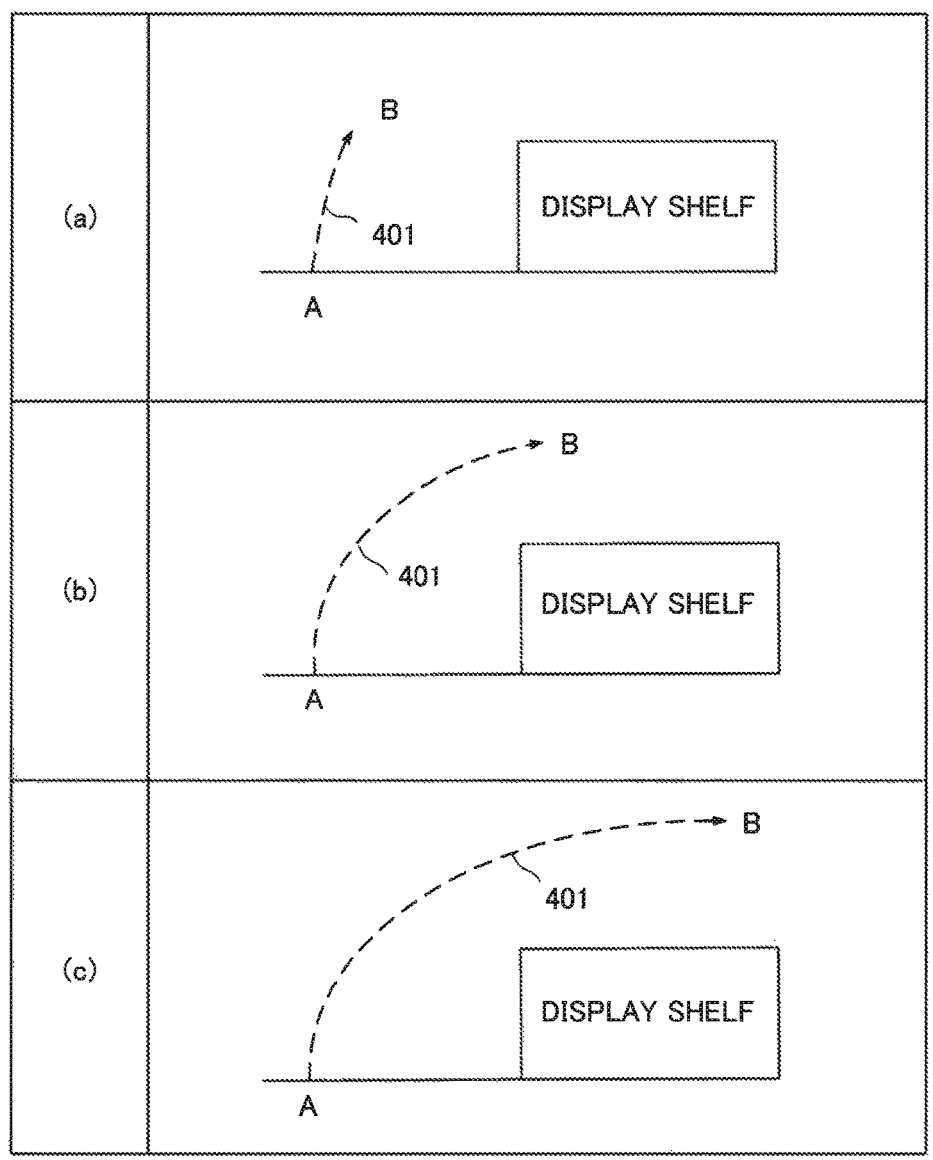
FIG. 6 is a diagram describing a display example of a movement path of an object by a moving image.

The moving image display unit 202 has a function of displaying the flow line information pieces 401 to 404 as illustrated in FIG. 5 by the moving image as follows. For instance, FIG. 6 illustrates an example, in which the flow line information piece 401 in FIG. 5 is displayed by the moving image. FIG. 6 is a diagram describing a display example of the moving image by the moving image display unit 202.

For instance, the start point of movement of the person illustrated by the flow line information piece 401 is A, and the end point thereof is B. The end point B is moved as illustrated in the order of (a), (b), and (c) of FIG. 6. The moving image display unit 202 causes the display device 30 to display the state of the arrow which extends in such a manner as to draw the trace of movement from the start point A to the end point B by the moving image.

Specifically, (a) of FIG. 6 illustrates a state of the arrow representing the flow line information piece 401 to be displayed immediately after moving image display is started. In other words, the flow line information piece 401 is displayed as the arrow slightly extending from the start point A.

(b) of FIG. 6 illustrates a state of the arrow representing the flow line information piece 401 to be displayed when about a half of the moving image is reproduced.

(c) of FIG. 6 illustrates a state of the arrow representing the flow line information piece 401 to be displayed immediately before moving image display is finished.

As described above, as illustrated in the order of (a), (b), and (c) of FIG. 6, the moving image display unit 202 causes the display device 30 to display the flow line information piece 401 by the moving image by extending the arrow in such a manner as to draw the trace of movement of the end point B. Then, the movement display unit 202 terminates reproduction of the moving image when the end point B reaches a final point.

Note that a method for displaying the moving image representing the flow line information by the moving image display unit 202 is not limited to the aforementioned method. As far as a state of movement of a person is known, any display method may be used.

Figure 7:
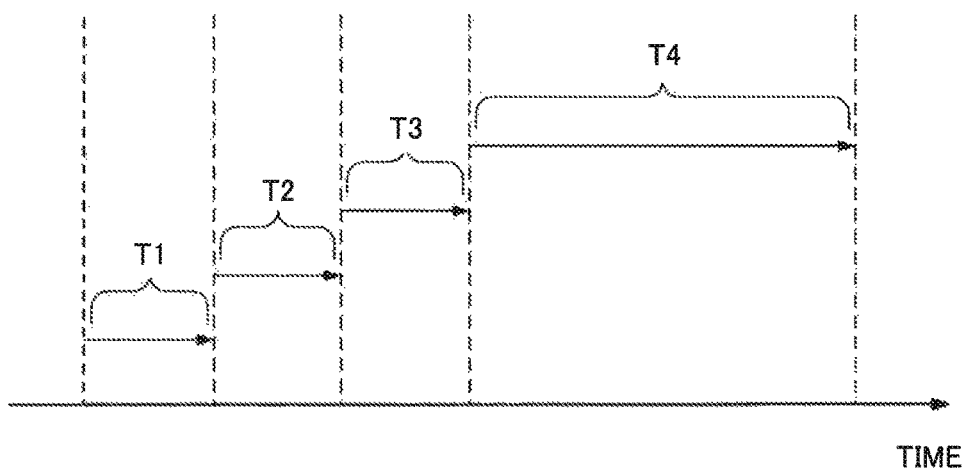
FIG. 7 is a diagram describing a display example of a plurality of movement paths.

For instance, the moving image display unit 202 may have a function of causing the display device 30 to display the plurality of flow line information pieces 401 to 404 as illustrated in FIG. 5 by the moving image. FIG. 7 is a diagram describing the order in which the flow line information pieces 401 to 404 by the moving image display unit 202 are caused to be displayed by the display device 30 by the moving image.

Specifically, the movements of persons respectively represented by the flow line information pieces 401 to 404 in FIG. 5 are performed in the order of the flow line information piece 401→the flow line information piece 402→the flow line information piece 403→the flow line information piece 404. In this case, the moving image display unit 202 causes the display device 30 to display the arrows representing the flow line information pieces 401 to 404 in a time-series manner according to the order.

In other words, the moving image display unit 202 causes the display device 30 to display movement of the arrow based on the flow line information piece 401 representing the state of movement of the person performed at a first time by the moving image, for instance, in a period T1 in FIG. 7. Then, after the moving image display based on the flow line information piece 401 is terminated, the moving image display unit 202 causes the display device 30 to display the movement of the arrow based on the flow line information piece 402 representing a state of movement performed at a next time by the moving image, for instance, in a period T2 in FIG. 7.

Further, as well as the above, after moving image display based on the flow line information piece 402 is terminated, the moving image display unit 202 causes the display device 30 to display the movement of the arrow based on the flow line information piece 403 representing a state of movement performed at a next time by the moving image, for instance, in a period T3 in FIG. 7. Furthermore, after moving image display based on the flow line information piece 403 is terminated, the moving image display unit 202 causes the display device 30 to display the movement of the arrow based on the flow line information piece 404 representing a state of movement performed at a next time by the moving image, for instance, in a period T4 in FIG. 7.

Durations of the periods T1 to T4 during which the arrows based on the respective flow line information pieces 401 to 404 are displayed by the moving image depending on the move times of persons represented by the flow line information pieces 401 to 404. Note that the periods T1 to T4 may be the same durations of times as the actual move times of persons, or may be times shortened by a predetermined ratio.

Figure 8:
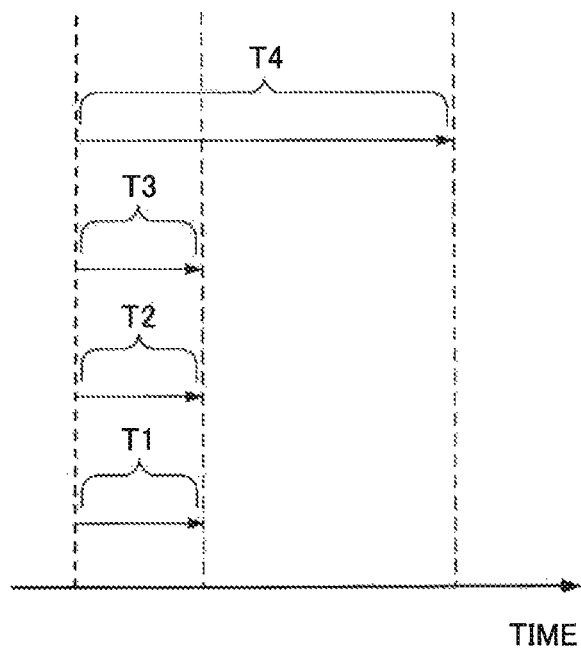
FIG. 8 is a diagram describing another display example of a plurality of movement paths.

FIG. 8 is a diagram describing another example in which the moving image display unit 202 causes the display device 30 to display the flow line information pieces 401 to 404 by the moving image. In the example of FIG. 8, the moving image display unit 202 causes the display device 30 to display movements of persons started at different times under an assumption that the movements are started at the same time by the moving image.

Specifically, it is assumed that movements of persons represented by the flow line information pieces 401 to 404 are respectively started at different times. On the other hand, the moving image display unit 202 displays the flow line information pieces 401 to 404 by the moving image during the periods T1 to T4 illustrated in FIG. 8. Specifically, the moving image display unit 202 starts to display the respective flow line information pieces 401 to 404 by the moving image at the same time. In other words, the moving image display unit 202 displays the flow line information pieces 401 to 404 simultaneously by the moving image.

Note that even when the flow line information pieces 401 to 404 are started to be displayed simultaneously by the moving image, durations of the periods T1 to T4 during which the arrows are moved based on the flow line information pieces 401 to 404 correspond to move times of persons represented by the respective flow line information pieces 401 to 404. Note that the periods T1 to T4 may be the same durations of times as the times during which persons actually move, or may be times shorted by a predetermined ratio.

The configuration of the information processing device 10 of the second example embodiment other than the above is the same as the first example embodiment.

[Description of Operation]

Figure 9:
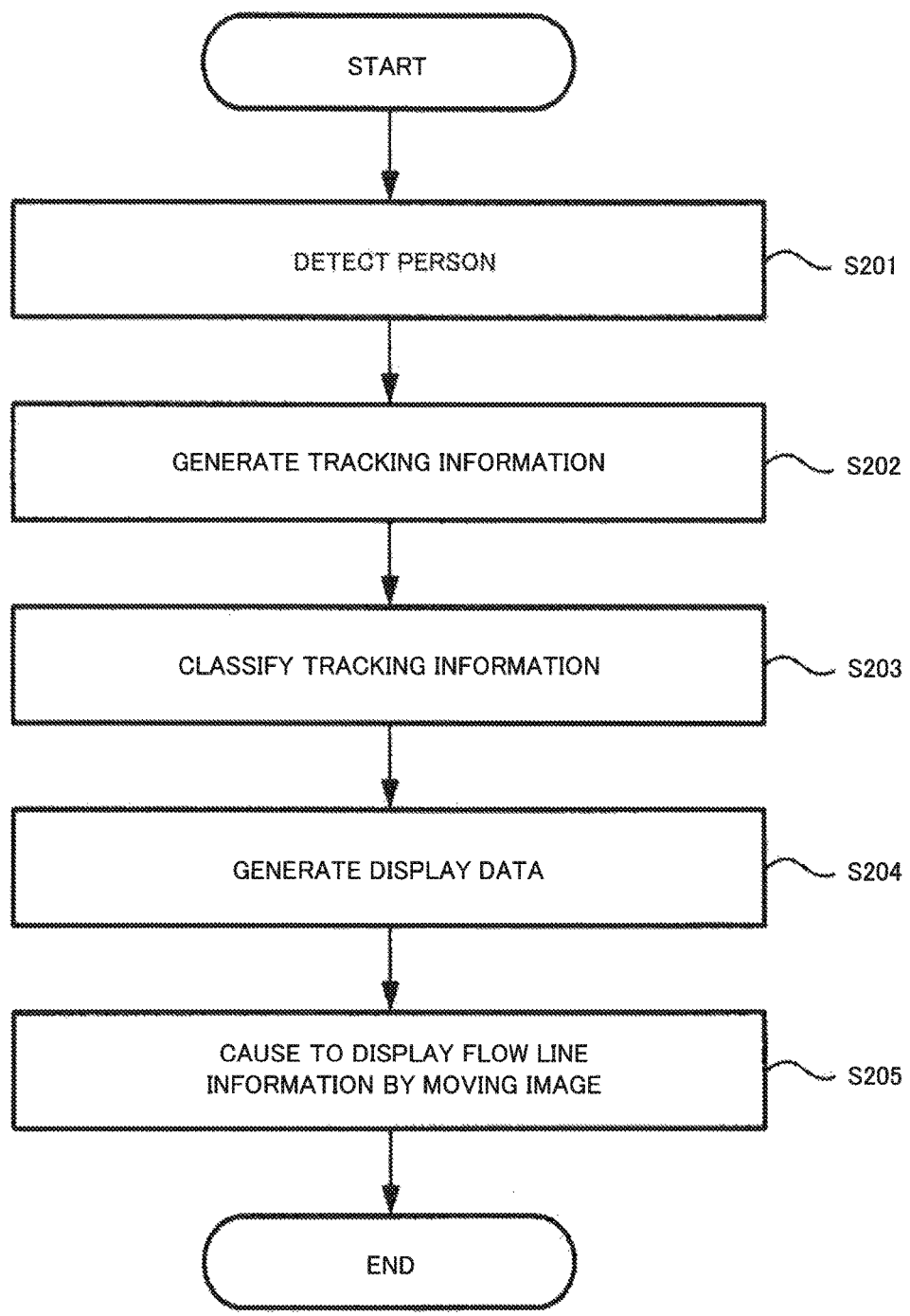
FIG. 9 is a flowchart illustrating an operation example of an analysis result in the information processing device of the second example embodiment.

In the following, an operation example of the information processing device 10 of the second example embodiment is described referring to FIG. 9. FIG. 9 is a flowchart illustrating an operation example of personal behavior analysis processing by the information processing device 10. The flowchart of FIG. 9 illustrates a processing procedure to be executed by the CPU in the information processing device 10.

For instance, the track unit 100 detects the person from the captured image (the floor image) received from the camera 20 (Step S201).

Thereafter, the track unit 100 calculates the position information of the person detected for each frame. Then, the track unit 100 generates the tracking information based on each position information calculated (Step S202). The track unit 100 outputs the tracking information generated to the detection unit 101.

The detection unit 101 classifies the tracking information received for each person (Step S203). Thereafter, the detection unit 101 outputs the tracking information classified for each person to the data generation unit 201.

The data generation unit 201 generates display data relating to movement of each person based on the tracking information received for each person (Step S204). Thereafter, the data generation unit 201 outputs the display data generated to the moving image display unit 202.

The moving image display unit 202 causes the display device 30 to display the state of movement of each person (flow line information) by the moving image based on the display data received (Step S205).

The information processing device 10 in the second example embodiment has a function of allowing the moving image display unit 202 to display the state of movement of the person detected from the captured image of the camera 20 by the moving image on the display device 30.

Thus, the information processing device 10 allows the user of the device 10 to dynamically grasp movement of the person on the floor to be monitored. Further, the information processing device 10 allows the user to dynamically compare movements of the plurality of persons on the floor to be monitored.

Further, the information processing device 10 in the second example embodiment allows the moving image display unit 202 to display the state of movement of each person in the order of movements by the moving image on the display device 30. Further, the moving image display unit 202 is also able to cause the display device 30 to display the state of movement of each person under the assumption that the movements are started at the same time by the moving image. In this way, displaying under the assumption that movements are started at the same time is advantageous for the information processing device 10 in allowing the user to easily compare the moving direction or the move time regarding movement of each person.

Other Example Embodiment

Figure 11:
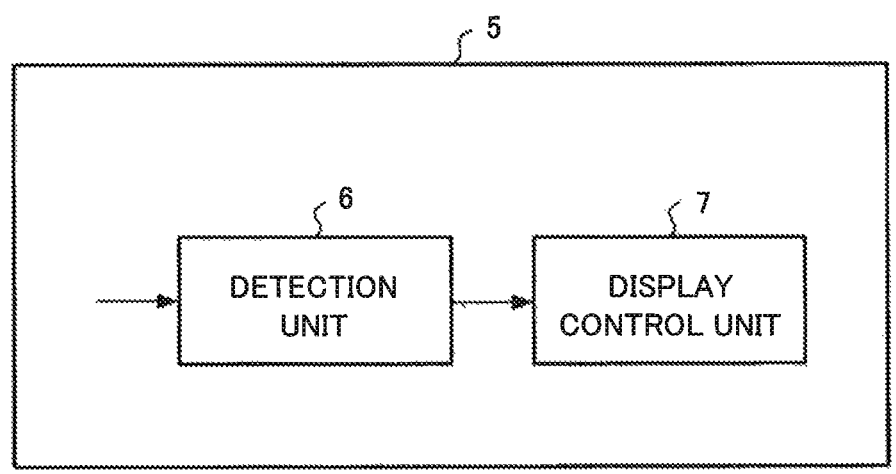
FIG. 11 is a block diagram illustrating simply a configuration of an information processing device of another example embodiment according to the present invention.

FIG. 11 is a block diagram illustrating simply a configuration of an information processing device of another example embodiment according to the present invention. In the example of FIG. 11, an information processing device 5 includes a detection unit 6 and a display control unit 7. The detection unit 6 has a function of classifying information (tracking information) relating to movement of an object to be monitored based on movement path information included in the information for each movement path. The display control unit 7 has a function of controlling a display device to display an arrow whose thickness represents the number of pieces of information (tracking information) classified for each movement path, and whose shape and direction represent the movement path on the display device.

The information processing device 5 has the aforementioned configuration, thereby being able to display the number of objects moving along a predetermined path, and the movement path simultaneously.

Further, the display control unit 7 may control the display device to display the arrow whose length depending on a move time included in flow line information on the display device.

With such the configuration, the information processing device 5 is also able to display the move time of the object together.

Further, the information processing device 5 may include a moving image display unit that causes to display a trace of movement representing the flow line information of the object by the moving image representing a state that the arrow is extending.

With such the configuration, the information processing device 5 is able to cause to dynamically display the state of movement of the object in an area to be monitored.

Further, the moving image display unit may cause to display a state that arrows depending on pieces of the flow line information of a plurality of objects are extending in the order in which movements of the objects are started by the moving image, respectively.

With such the configuration, the information processing device 5 is able to cause to display such that the user can dynamically compare the states of movements of objects.

Further, the moving image display unit may display states that arrows depending on a plurality of pieces of the flow line information of the object are extending simultaneously by the moving image.

The information processing device 5 having the aforementioned configuration is able to cause to display states of movements of objects under the assumption that the movements are started at the same time.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2014-184741, filed on Sep. 11, 2014, the disclosure of which is incorporated herein in its entirety by reference.

A part or all of the aforementioned example embodiments may be described in the following Supplementary Notes, but is not limited to the following.

(Supplementary Note 1)

A display system includes:

a detection unit that has a function as a classifying unit which classifies flow line information of an object for each movement path represented by the flow line information; and a display control unit that displays an arrow whose thickness reflects the number of pieces of the flow line information classified for a predetermined movement path and whose direction and shape reflect the predetermined movement path.

(Supplementary Note 2)

In the display system according to Supplementary Note 1, the display control unit displays the arrow whose length reflects a move time represented by the flow line information.

(Supplementary Note 3)

In the display system according to Supplementary Note 1 or 2, the display system includes a moving image display unit that displays a state that the arrow is extending from a start point of the movement path represented by the flow line information of the object to an end point by a moving image.

(Supplementary Note 4)

In the display method according to Supplementary Note 3, the moving image display unit displays a state that the arrows depending on a plurality of pieces of the flow line information of the object are extending in the order in which movements represented by the pieces of the flow line information are started by the moving image, respectively.

(Supplementary Note 5)

In the display system according to Supplementary Note 3, the moving image display unit displays a state that the arrows depending on a plurality of pieces of the flow line information of the object are extending simultaneously by the moving image.

(Supplementary Note 6)

A display method includes:

classifying flow line information of an object for each movement path represented by the flow line information; and displaying an arrow whose thickness reflects the number of pieces of the flow line information classified for a predetermined movement path, and whose direction and shape reflect the predetermined movement path.

(Supplementary Note 7)

In the display method according to Supplementary Note 6, the arrow whose length reflects a move time represented by the flow line information is displayed.

(Supplementary Note 8)

A display program causes a computer to execute:

classifying flow line information of an object for each movement path represented by the flow line information; and displaying an arrow whose thickness reflects the number of pieces of the flow line information classified for a predetermined movement path, and whose direction and shape reflect the predetermined movement path.

(Supplementary Note 9)

In the display program according to Supplementary Note 8, the display program causes the computer to execute:

displaying an arrow, whose length reflects a move time represented by the flow line information.

REFERENCE SIGNS LIST

10 Information processing device
100 Track unit
101 Detection unit
102 Direction calculation unit
103 Time calculation unit
104 Accumulation unit
105 Display control unit
201 Data generation unit
202 Moving image display unit

What is claimed is:

1. An information processing device comprising:
a processor configured to:
classify information on movement of a plurality of objects to be monitored into a plurality of movement paths based on movement path information included in the information; and
control a display device equipped with a display screen to display movement of the plurality of objects on the display screen using an arrow for each movement path, wherein
an axis of the arrow corresponding to a movement path displayed by the display device has a thickness depending on the number of pieces of the information classified into the movement path, and has a shape depending on a trace of an object corresponding to the movement path, a direction of the arrow representing a moving direction of the object, and
the processor controls the display device such that a length of the axis of the arrow displayed on the display device depends on an average time of move times of a plurality of objects whose moving directions are the same as the moving direction of the object.

2. The information processing device according to claim 1,
wherein the processor is further configured to control the display device such that the movement of the object on the movement path is displayed on the display device by a moving image representing a state that the arrow is extending based on the information on the movement of the object.

3. The information processing device according to claim 2, wherein the processor controls a movement of the arrow such that a plurality of the arrows representing the movements of the objects on the movement paths are started to move in an order in which the movements of the object are started.

4. The information processing device according to claim 2, wherein the processor controls a movement of the arrow such that movements of the arrows representing the movements of the object on the movement paths are simultaneously started.

5. The information processing device according to claim 1, wherein the processor is further configured to control the display device such that the positions of start points of the arrows are aligned.

6. A display method comprising:
by a processor,
classifying information on movement of a plurality of objects to be monitored into a plurality of movement paths based on movement path information included in the information;
controlling a display device equipped with a display screen to display movement of the plurality of objects on the display screen using an arrow for each movement path such that an axis of the arrow corresponding to a movement path displayed has a thickness depending on the number of pieces of the information classified into the movement path, and has a shape depending on a trace of an object corresponding to the movement path, and a direction of the arrow represents a moving direction of the object; and
controlling the display device such that a length of the axis of the arrow displayed on the display device depends on an average time of move times of a plurality of objects whose moving directions are the same as the moving direction of the object.

7. A non-transitory program storage medium storing a computer program that causes a computer to execute:
- classifying information on movement of a plurality of objects to be monitored into a plurality of movement paths based on movement path information included in the information;
- controlling a display device equipped with a display screen to display movement of the plurality of objects on the display screen using an arrow for each movement path such that an axis of the arrow corresponding to a movement path displayed has a thickness depending on the number of pieces of the information classified into the movement path, and has a shape depending on a trace of an object corresponding to the movement path, and a direction of the arrow represents a moving direction of the object; and
- controlling the display device such that a length of the axis of the arrow displayed on the display device depends on an average time of move times of a plurality of objects whose moving directions are the same as the moving direction of the object.

* * * * *